April 11, 1967 L. DUBIN 3,313,340

HEAT EXCHANGER

Filed March 23, 1965 3 Sheets-Sheet 1

INVENTOR
LESTER DUBIN
BY
Morgan, Finnegan, Durham & Pine
ATTORNEYS

FIG. 4
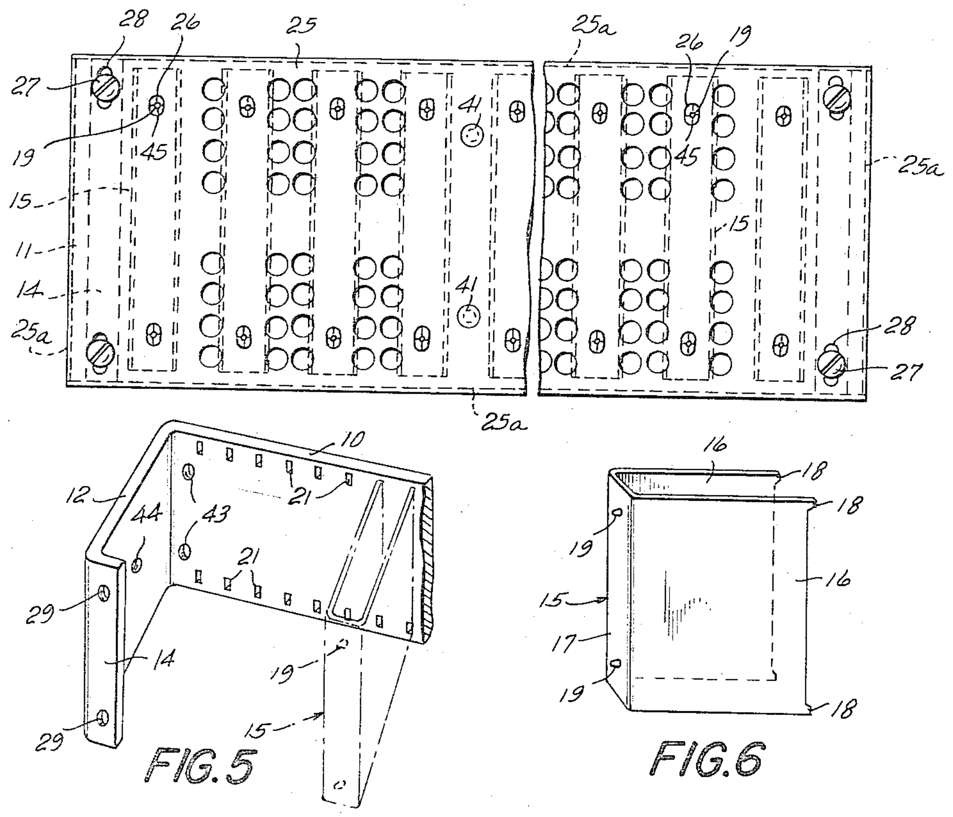
FIG. 5, FIG. 6
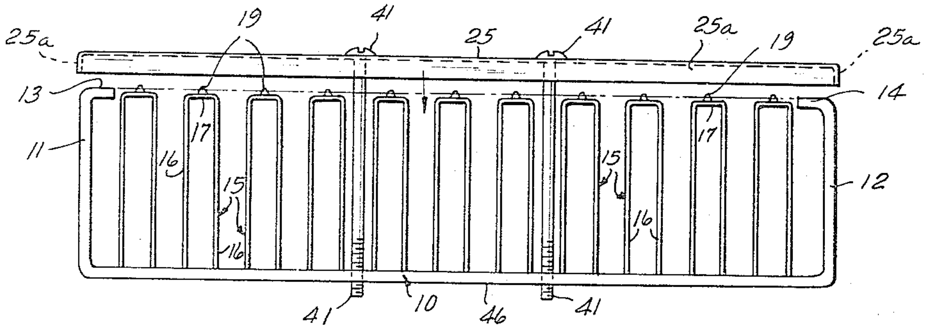
FIG. 7
INVENTOR
LESTER DUBIN
BY
Morgan, Finnegan, Durham & Pine
ATTORNEYS

HEAT EXCHANGER

Filed March 23, 1965 3 Sheets-Sheet 3

INVENTORS
LESTER DUBIN
BY
MORGAN, FINNEGAN, DURHAM & PINE
ATTORNEYS

United States Patent Office 3,313,340
Patented Apr. 11, 1967

3,313,340
HEAT EXCHANGER

Lester Dubin, Westchester, N.Y., assignor to Lambda Electronics Corporation, Huntington, N.Y., a corporation of New York Filed Mar. 23, 1965, Ser. No. 442,146
6 Claims. (Cl. 165—80)

This invention relates to heat exchangers and more particularly to exchangers for transferring heat from electrical equipment.

This is a continuation-in-part of applicant's prior copending application of the same title, Ser. No. 118,638, filed June 21, 1961.

A wide variety of heat exchangers are currently in use in the electronic packaging art, these exchangers being employed to dissipate heat generated by electrical components. The effective dissipation of heat in such arrangements is important as it affects the stability and operating capacity of many electrical components. In addition, effective heat dissipation permit maximum density in the packaging of electrical components, and this is particularly important in many applications where space is at a premium. The advent of solid state devices such as transistors and the increasing emphasis on miniaturization has placed greater demands on heat exchange units. This has reached the point where conventional exchangers are no longer adequate in many applications.

It is accordingly an object of the invention to provide improved heat exchange means for electronic equipment.

A still further object of the invention is to provide heat exchange means for electronic equipment which are simply fabricated, readily assembled, and not burdened by the many limitations which characterize the casting art.

It is well known that the conduction of heat increases with the total surface area available for that purpose. One of the best ways to provide maximum surface area in minimum space is to use heat exchangers having plate-like fins which project perpendicularly away from the electronic component supporting surface or base member of the exchanger. However, those exchangers are efficiently operable only when oriented with their fins vertically positioned, so that the dissipation of heat by air convection can take place. This limitation is of particular significance inasmuch as it limits the positions in which the electronic equipment can be effectively utilized. Consequently, for example, power supplies which might otherwise be operable while lying on their sides or when secured to a wall or bulkhead can be operated only when in an upright position, so that the air convection currents will be able to rise between the plates. In addition a piece of equipment or unit which might be designed dimensionally so as to be racked in combination with other similarly designed equipment either in an upright position or on its side, is limited in its design capabilities by the position of its heat exchanger unit.

Therefore, it is an additional object of the instant invention to provide a multi-positional heat exchanger which is efficiently operable with its fins either in vertical or horizontal alignment.

A still further object of the invention is to provide a heat exchanger adapted to dissipate heat by convection, conduction and radiation while serving at the same time as a support for electronic components such as transistors.

A still further object of the invention is to provide a heat exchanger which provides an unusually large degree of heat transfer in comparison with the volume occupied by the exchanger.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally the invention comprises a base member which also serves as a support for electronic components, a plurality of radiation plate forming means, the plate forming means including guide means which cooperate with mating guide means in said base member thus permitting the location and registration of the plate forming means in the structure defined by the base member. A cover assembly is also provided which engages the base member and plate forming means thus providing additional structural integrity in the exchanger. The plates thus formed each have at least one elongated opening extending perpendicularly away from the base member, these openings being aligned along a common axis to form an upward passage for convective currents when the exchanger is positioned with the plates horizontally disposed.

Briefly and generally the method of producing the exchanger according to the invention includes the steps of fabricating, assembly and registering the base member, plate forming means and cover, temporarily clamping the same and heating and soldering the same at selected locations.

The invention consists in the novel parts, constructions, arrangements, combinations, improvements, methods, steps and procedures herein shown and described.

An exemplary embodiment of the invention is illustrated in the drawings of which:

FIGURE 4 is an elevation view illustrating the heat exchanger as seen from the rear of FIGURE 1;

FIGURE 5 is a perspective, fragmentary view of the base member of the exchanger together with one of the plate-forming means shown in phantom;

FIGURE 6 is a perspective view of one of the plate forming means;

FIGURE 7 is a view of the heat exchanger showing the relationship among the elements during one stage of the assembly thereof;

Figures 1, 2, 3:
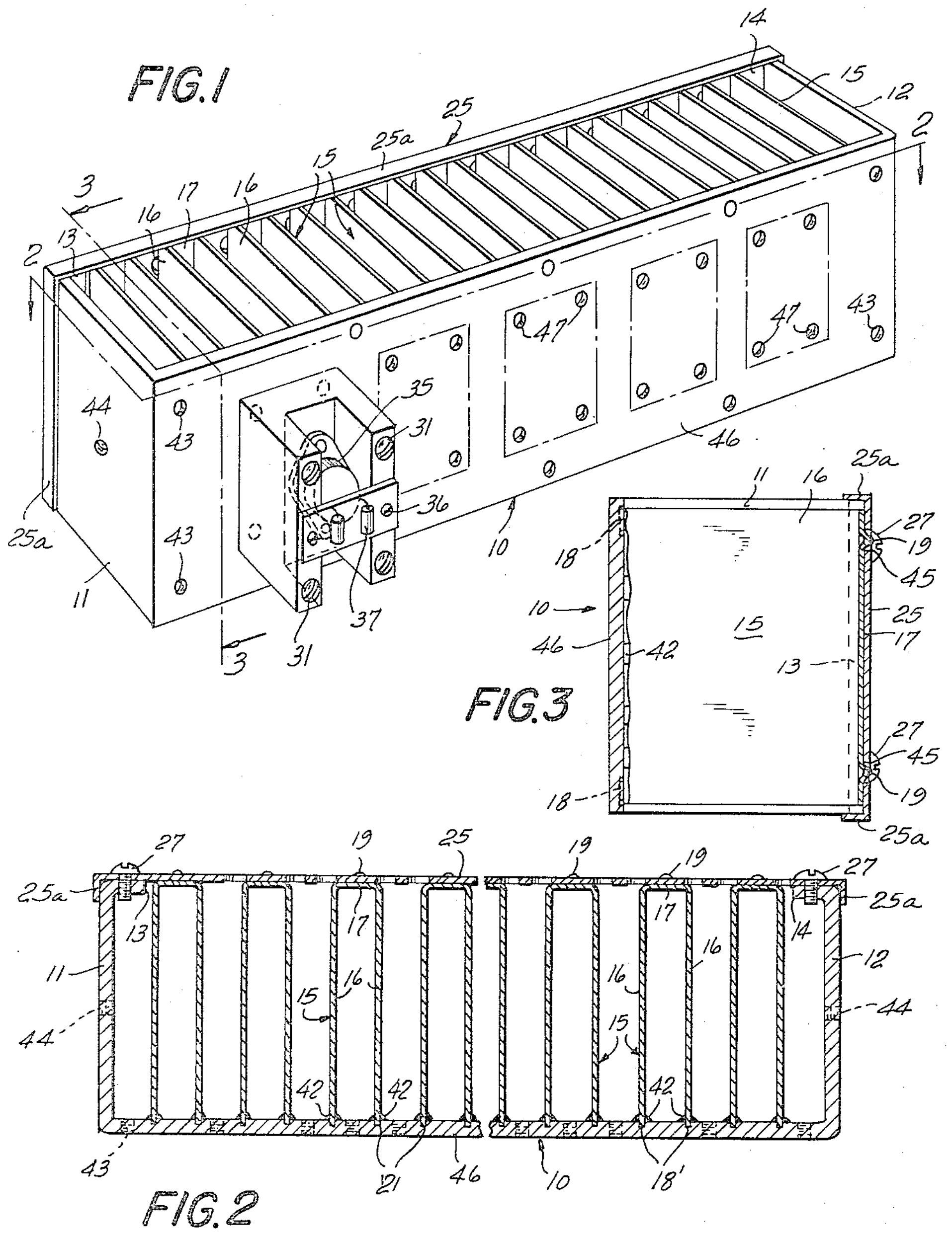
FIGURE 1 is a perspective view illustrating the entire heat exchanger together with an electronic assembly mounted thereon.
FIGURE 2 is a plan view partly in section taken along the lines 2—2 of FIGURE 1.
FIGURE 3 is an end elevation view partly in section taken along the lines 3—3 of FIGURE 1.

The exchanger according to the invention comprises a base member 10 having orthogonal sides 11 and 12 integral therewith. The distal ends of sides 11 and 12 are turned inwardly to form flange sections 13 and 14, respectively. Adapted to cooperate with base member 10 are a cover 25 and a plurality of plate-forming means 15 in the shape of channel members each having sides 16 and an integral bridge section 17. Integral with each side 16 and depending therefrom are a pair of guide lugs 18 (FIGURES 2, 3 and 6). These lugs are adapted to be inserted in corresponding depressions 21 in base member 10 (FIGURE 5). When the plate members 15 are so disposed, they form a plurality of parallel fins or plates, each plate comprising the side 16 of the respective plate-forming member. The spacing between adjacent plate-forming means 15 is approximately equal to the spacing between the sides 16 of one of the plate-forming means so that the resultant fins are substantially equally spaced along the entire length of base member 10.

Besides integral guide lugs 18 each plate-forming member 15 has extending orthogonally from its respective bridge section 17 a pair of nipples 19. These nipples are embossed in bridge section 17 and are aligned with apertures 26 (FIGURE 4) in cover plate 25. The latter also includes additional perforations 23 and is mounted over the open section of base member 10, being seated on flanges 13 and 14 and secured thereto by means of screws 27 which pass through apertures 28 in the cover plate and are threadably inserted in tapped holes 29 (FIGURE 5) in the base flange sections 13 and 14. As is evident in FIGURES 1 and 2, cover plate 25 aids in confining the plate-forming members 15 in their spaced, parallel disposition along base 10.

The components described thus far are preferably of copper but may also be brass or tin plated steel. The components are produced preferably in the following manner: Cover 25, derived from stock in any acceptable manner, is subjected to a punching operation to form the various perforations therein, and to a bending operation to form the four sides **25*a* thereof. The corners of plate 25 are initially notched in a die to facilitate the formation of the sides 25*a***.

The base member 10, preferably sheared from stock, is subjected to a bending operation to form sides 11 and 12 and is additionally drilled and tapped to provide the various mounting holes therein. The depressions 21 are formed by a cold forging, e.g., stamping operation, and the flanges 13 and 14 are formed by bending.

The formation of the plate-forming members 15 is accomplished by a bending operation to form the sides 16 thereof, by an embossing operation to form the nipples 19 and by a notching operation to cut out the space between lugs 18. It may be seen from the above that inexpensive mass production techniques are employed in the formation of the exchanger components.

Assembly of the components of the exchanger is accomplished as follows:

(1) The plate members 15 are inserted in the base 10 with the guide lugs 18 being disposed in the depressions 21.

(2) After the plate-forming members 15 have been registered in and mounted on base 10, as seen in FIGURE 7, cover 25 is placed over this assembly and the holes 26 therein aligned with the nipples 19 in the members 15.

(3) Thereafter the cover may be fastened to the base by means of screws 27.

(4) In order to temporarily clamp members 15 to base 10 and to bring cover 25 into intimate contact with the bridge sections 17 of members 15, the cover is urged in the direction of the members 15 and held there by suitable temporary clamping means such as screws 41 (FIGURE 7). These pass through holes in the cover and are threadably inserted in tapped holes in base member 10. In this connecton it is noted that sides 11 and 12 of the base extend outward therefrom to a greater degree than do the sides 16 of the channel members 15. Thus when cover plate 25 is clamped by means of screws 41, it presents a slightly bowed appearance. This more readily accomplishes the necessary contact between the cover and the plate-forming members.

(5) The unit thus assembled is de-greased.

(6) After de-greasing the exchanger is heated to a temperature sufficient for a soldering operation and strips of solder are brought into contact with the base member in the region of guide lugs 18 and depressions 21. The assembly is slightly tilted so that when the solder softens it runs along the corners defined by each side 16 and base member 10. The resulting fillets 42 may be seen in FIGURES 2, 3. This soldering operation provides a complete high-conductivity thermal connection between the base 10 and each fin 16. With the assembly still heated solder is also applied in the region of the apertures 26 and nipples 19, thus forming a soldered connection 45 between the cover 25 and the fins 16. Thereafter the temporary mounting screws 41 are removed.

(7) Finally a black wrinkle finish is provided on all surfaces except surface 46 of base 10.

In use the base member 10 provides a mounting surface for suitable electronic equipment such as a plurality of modules 30, FIGURE 1 (only one shown). These modules 30 of a metal such as aluminum carry electronic components such as transistors 35, a terminal board 36 and resistors, condensers, etc 37. The module 30 is secured to base 10 by means of screws 31 which pass through holes in the sides of the modules and into tapped holes 47 in the base. The entire exchanger may be connected in turn to a chassis or other structure by means of studs or bolts which engage holes 43 in the base. Holes 44 for a similar purpose or for the mounting of other components are also provided.

In operation heat generated by the electrical components is transferred principally by conduction to base 10 and thence to fins 16, also by conduction. This heat is transferred in turn to the surrounding medium from fins 16 by means of conduction, radiation and convection. The convection may be natural or forced and the fins are accordingly arranged preferably in vertical planes to facilitate one or all of these modes. It may be seen from the foregoing that a compact, highly efficient exchanger may be produced and assembled by and large by inexpensive mass production techniques. The exchanger according to the invention has proved to be extremely efficient in a number of applications including the cooling of electronic power supplies.

Figures 8, 9:
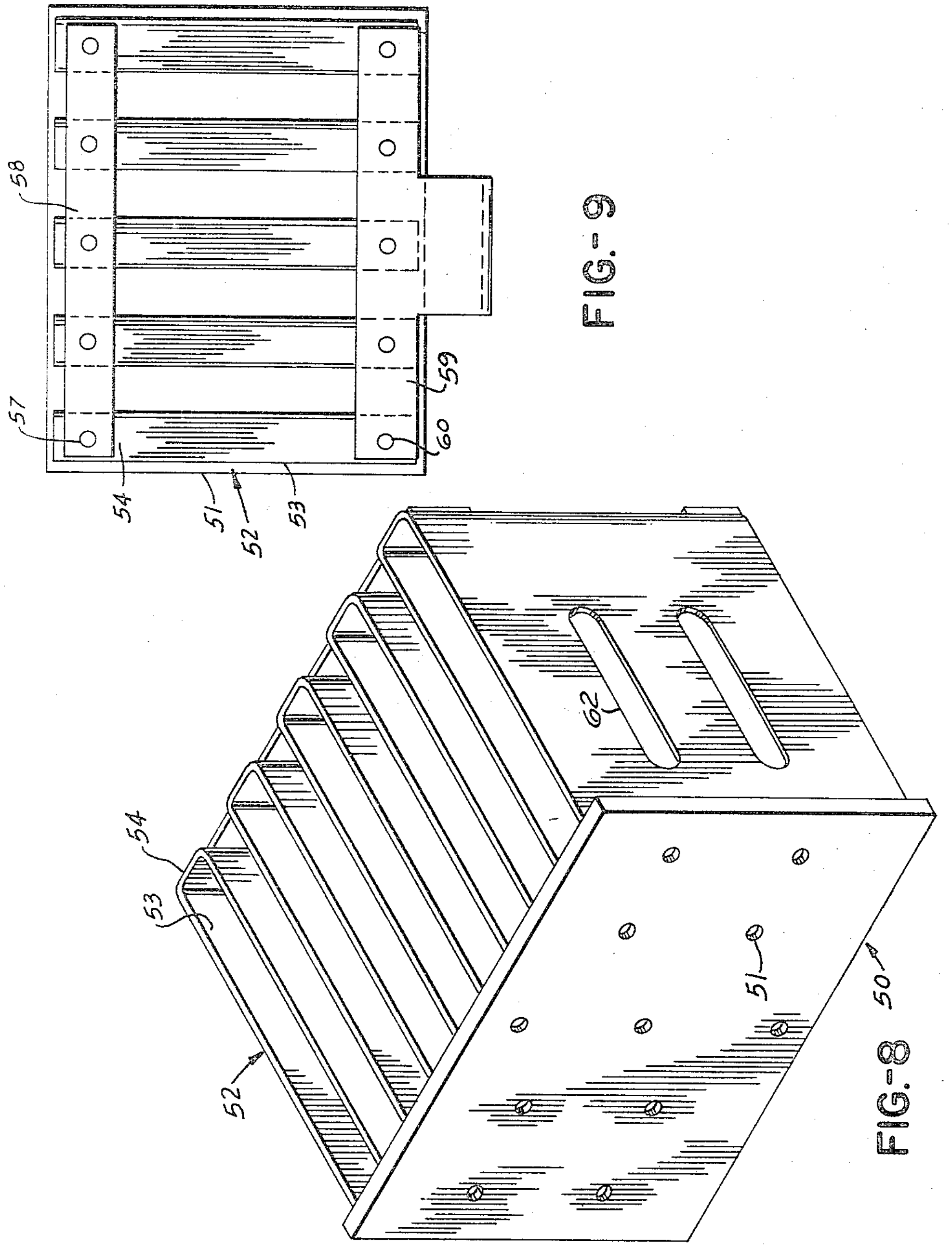
FIGURE 8 is an isometric view of a further embodiment of the heat exchanger according to the invention.
FIGURE 9 is a rear elevation view of the heat exchanger of FIGURE 8.

In the further embodiment of the invention shown in FIGURES 8 and 9, the exchanger is constructed essentially as in the first embodiment. The further embodiment shows illustratively, a heat exchanger for use in a ¼ rack power supply module.

A base member 50 is provided having a plurality of tapped holes 51 for mounting suitable electronic equipment thereon. The method of mounting this equipment is fully described above in the first embodiment shown.

Adapted to cooperate with base member 50 are a plurality of plate-forming members 52 in the shape of channel members each having sides 53 and an integral bridge section 54. A pair of guide lugs (not shown) integrally depending from each side 53 are provided and are adapted to be inserted in corresponding depressions (not shown) in the base member. When the plate members are so disposed, they form a plurality of parallel fins or plates, each plate comprising the side 53 of the respective plate-forming member. The plate-forming members are spaced along the base member so that the distances between the sides 53 are substantially equal to the distances between adjacent plate-forming members. In this way, the plates or fins formed thereby are equally spaced along the base member.

Each plate-forming member 52 has, extending orthogonally from its respective bridge section 54, a pair of nipples 57 which are embossed in their respective bridge sections 54. A pair of flat spacing and supporting members 58 and 59 are provided with apertures 60 which are aligned so as to mate with nipples 57. These flat spacing members aid in confining the plate-forming members 52 in their spaced, parallel disposition along base 50.

The plate-forming members are soldered to the base and to the spacing and supporting members substantially as described herein for the first embodiment.

The components described are preferably of copper but may also be brass or tin plated steel and are coated with a black wrinkle finish, except for surface 61 of the base member 50.

Each side 53 of its plate-forming member 52 is provided with a pair of oblong apertures or slots 62 which run lengthwise along sides 53 so as to be in transverse relationship with base member 50. Slots 62 are identically formed and positioned in sides 53 so as to be in alignment with one another.

The heat exchanger as shown in FIGURE 8, is in the normal upright position for use with its fins or plates in vertical arrangement. The spacing between the plates and orientation thereof enables the air convection currents to rise, thereby aiding in the dissipation of heat. The slots in the plates are dimensionally designed and positioned according to the invention, so that the transfer of heat by conduction is not materially impaired by the removal of some of the conducting area in the plates, and in this connection it has been found that the location and size of the slots, for a given configuration of heat generating elements on base 50, can be adjusted so that there is no substantial impairment of the heat dissipation ability in the normal position. The electronic unit in which the heat exchanger is used, may be used on its side so that the plates will be horizontally positioned. The transfer of heat by conduction is not significantly altered by this change of orientation of the heat exchanger. Normally, however, in the absence of the slots, the dissipation of heat by convection would be almost entirely eliminated. With the addition of the slots, according to the invention, the air convection currents will be able to rise through the plates without material impairment of the convection process.

The invention in its broader aspects is not limited to the specific elements, steps, methods, compositions, combinations and improvements shown and described, but departures may be made therefrom within the scope of the accompanying claims without departing from the principles of the invention and without sacrificing its chief advantages.

What is claimed is:

1. A multi-positional heat exchanger for electronic equipment having heat generating electronic components comprising a metallic base member directly thermally coupled to said heat generating electronic components, a plurality of parallel spaced apart heat conductive plate members orthogonally depending from said base member in thermal engagement therewith, each of said plate members having at least one elongated aperture extending perpendicularly away from said base member, said openings being aligned with one another to provide air communication between said plate-members whereby an upward passageway is provided through said plate members when said members are horizontally disposed.

2. A heat exchanger according to claim 1, wherein said openings are aligned along a common axis parallel to said base member.

3. A heat exchanger according to claim 1, wherein said openings are aligned along a common axis perpendicular to said plate members.

4. A multi-positional heat exchanger for electronic equipment having heat generating electronic components comprising a metallic base member directly thermally coupled to said heat generating electronic components, a plurality of parallel heat dissipating plate members orthogonally depending from said base member in thermal engagement therewith, said plate members being arranged in spaced relation one to the other, each of said plate members having a pair of identical slot-like openings equidistant from said base member and extending perpendicularly away therefrom, said apertures of each of said plate members being aligned with the corresponding apertures of said other plate members along common axes perpendicular to said plate members to define two vertical passageway for convective currents when said exchanger is positioned with said plate members horizontally disposed.

5. A multi-positional heat exchanger for electronic equipment comprising a metallic front member adapted for direct thermal coupling with heat dissipating electronic components, a plurality of heat conductive plate-forming members connected to said front member to form a plurality of orthogonally depending parallel heat dissipating plates arranged in spaced relation one to the other, said front member and said plate-forming members having cooperating positioning means for automatically registering said plate-forming members in proper spaced relation with said front member, at least one heat conductive rear plate-spacing member connected to said plate-forming members, said rear member and said plate-forming members having cooperating positioning means for automatically registering said plate-forming members in proper spaced relation with said rear member, a plurality of fusible metal junctions permanently joining said plate-forming members to said front and rear members in heat conductive relation therewith, each of said heat dissipating plates having at least one elongated opening extending perpendicularly away from said front member, said openings being aligned along a common axis to define an upward passage for convective currents when said exchanger is positioned with said plates horizontally disposed.

6. A heat exchanger according to claim 5 wherein each of said plate-forming members comprises a channel-shaped member including a pair of spaced apart side sections forming said heat dissipating plates and a bridge section joining said side sections, said positioning means including a plurality of parallel spaced slots in said front member, a plurality of apertures in said rear member, a plurality of extensions at the free ends of said side sections positioned within said front member slots and at least one projection on each of said bridge sections positioned within one of said rear member apertures.

References Cited by the Examiner

UNITED STATES PATENTS

| | | | |
|---|---|---|---|
| 1,313,730 | 8/1919 | Pease | 165—166 |
| 2,471,011 | 5/1949 | Shapiro | 317—100 |
| 2,549,466 | 4/1951 | Hoheisel | 29—157.3 |
| 2,656,158 | 10/1953 | Hudson et al. | 29—157.3 |
| 2,784,947 | 2/1957 | Petersen | 257—245 |
| 2,818,237 | 11/1957 | Lehr et al. | 165—80 |
| 2,874,941 | 2/1959 | Woolard et al. | 257—245 |
| 2,949,283 | 8/1960 | Smith | 174—16 X |
| 2,958,515 | 11/1960 | Booker | 165—80 |
| 2,965,819 | 12/1960 | Rosenbaum | 165—80 X |
| 3,001,102 | 9/1961 | Stiefel et al. | 317—99 |
| 3,123,743 | 3/1964 | Perlmutter | 317—101 X |
| 3,167,688 | 1/1965 | Hein | 317—100 |
| 3,236,296 | 2/1966 | Dubin | 165—80 |

OTHER REFERENCES

German printed application No. 1,060,487, July 1959.

ROBERT A. O'LEARY, *Primary Examiner.*

T. W. STREULE, Jr., *Assistant Examiner.*